(12) United States Patent
Sofan et al.

(10) Patent No.: US 11,525,379 B2
(45) Date of Patent: Dec. 13, 2022

(54) EXHAUST-GAS TRACT FOR A MOTOR VEHICLE

(71) Applicant: Dr. Ing. h.c. F. Porsche Aktiengesellschaft, Stuttgart (DE)

(72) Inventors: Uli Sofan, Esslingen (DE); Marcel Noe, Königsbach-Stein (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 0 days.

(21) Appl. No.: 17/468,934

(22) Filed: Sep. 8, 2021

(65) Prior Publication Data

US 2022/0112826 A1  Apr. 14, 2022

(30) Foreign Application Priority Data

Oct. 13, 2020 (DE) .......................... 102020126773.8

(51) Int. Cl.

| | |
|---|---|
| *F01N 3/00* | (2006.01) |
| *F01N 3/20* | (2006.01) |
| *F01N 3/025* | (2006.01) |
| *F01N 3/26* | (2006.01) |
| *F01N 3/30* | (2006.01) |
| *F01N 3/38* | (2006.01) |

(52) U.S. Cl.
CPC .......... *F01N 3/2033* (2013.01); *F01N 3/025* (2013.01); *F01N 3/26* (2013.01); *F01N 3/30* (2013.01); *F01N 3/38* (2013.01); *F01N 2240/14* (2013.01); *F01N 2610/14* (2013.01)

(58) Field of Classification Search
CPC .......... F01N 3/2033; F01N 3/025; F01N 3/30; F01N 2240/14; F01N 2610/14; F16K 15/065; F16K 15/063; F16K 15/026; F16K 15/021
See application file for complete search history.

(56) References Cited

U.S. PATENT DOCUMENTS

| | | | | |
|---|---|---|---|---|
| 3,871,175 | A * | 3/1975 | Yamamoto | F16K 15/026 60/307 |
| 4,037,406 | A * | 7/1977 | Hartel | F01N 3/22 123/700 |
| 4,392,347 | A * | 7/1983 | Shows | F02C 3/26 60/39.27 |
| 4,404,795 | A * | 9/1983 | Oishi | F01N 3/222 60/303 |
| 5,284,016 | A * | 2/1994 | Stark | F01N 9/00 60/303 |

(Continued)

FOREIGN PATENT DOCUMENTS

| | | |
|---|---|---|
| DE | 0470361 A1 * | 2/1992 |
| DE | 102018114553 A1 | 12/2019 |
| EP | 3751196 A1 | 12/2020 |

*Primary Examiner* — Matthew T Largi
(74) *Attorney, Agent, or Firm* — RatnerPrestia

(57) ABSTRACT

An exhaust-gas tract for a motor vehicle has an exhaust-gas burner that includes an air inlet connection for the introduction of air into the exhaust-gas burner. The air inlet connection has a connection piece in which a check valve for the closure of the connection piece is arranged. The air inlet connection has an air inlet flange which connects the connection piece to a combustion chamber of the exhaust-gas burner and which seals off the combustion chamber. A motor vehicle incorporates the exhaust-gas tract.

12 Claims, 2 Drawing Sheets

(56) References Cited

U.S. PATENT DOCUMENTS

| | | | | |
|---|---|---|---|---|
| 5,301,504 A | * | 4/1994 | Bertling | F01N 3/227 137/506 |
| 5,339,630 A | * | 8/1994 | Pettit | F01N 3/2033 60/303 |
| 5,417,059 A | * | 5/1995 | Hartel | F01N 3/025 60/303 |
| 2015/0082777 A1 | * | 3/2015 | Tsumagari | F01N 3/0253 60/311 |
| 2015/0184565 A1 | * | 7/2015 | Shibuya | F01N 3/025 96/397 |

* cited by examiner

EXHAUST-GAS TRACT FOR A MOTOR VEHICLE

CROSS-REFERENCE TO RELATED APPLICATION

This application claims priority to German Patent Application No. 10 2020 126 773.8, filed Oct. 13, 2020, the content of such application being incorporated by reference herein in its entirety.

FIELD OF THE INVENTION

The present invention relates to an exhaust-gas tract for a motor vehicle, and to a motor vehicle.

BACKGROUND OF THE INVENTION

On the path to ever more environmentally friendly motor vehicles with internal combustion engines, an increasing focus is being placed on the treatment of the exhaust gases in the exhaust-gas tract of the motor vehicle. The ever more stringent environmental requirements place high demands on the exhaust-gas purification components in the exhaust-gas tract, such as catalytic converters or particle filters.

Exhaust-gas treatment in modern exhaust-gas tracts is quite complex. For example, the efficiency of catalytic converters is dependent on their temperature. In particular upon a cold start of the motor vehicle, the temperature of the catalytic converters normally lies below the so-called light-off temperature, proceeding from which the catalytic converters operate with high efficiency. Other exhaust-gas purification components, in particular particle filters, have to be brought to a regeneration temperature from time to time in order to be freed from soot particles deposited there.

It is known from the document DE 10 2018 114 553 A1, which is incorporated herein by reference, to heat an exhaust-gas tract in order to attain a particular temperature. For this purpose, an air inlet connection is provided for the feed of air into an exhaust-gas burner. In the exhaust-gas burner, fuel residues in the exhaust gas, which are added to the exhaust gas in targeted fashion through corresponding control of the internal combustion engine, are burned with the fed air in order to increase the temperature. As disclosed in DE 10 2018 114 553 A1, such exhaust-gas tracts may have check valves which prevent a fluid, for example a fuel-air mixture, from flowing out of the exhaust-gas burner. Such check valves are normally fixedly connected to the exhaust-gas burner and are difficult to access for repair, such that, in the event of a defect of the check valve, it is often necessary for the entire exhaust-gas burner, or even the exhaust-gas manifold together with the exhaust-gas burner, to be replaced.

SUMMARY OF THE INVENTION

Described herein is an exhaust-gas tract which does not have the stated disadvantages of the prior art, but in which the check valve is installed in an easily accessible manner and is inexpensive to manufacture.

The exhaust-gas tract has an exhaust-gas burner, wherein the exhaust-gas burner has an air inlet connection for the introduction of air into the exhaust-gas burner, wherein the air inlet connection has a connection piece in which a check valve for the closure of the connection piece is arranged, wherein the air inlet connection has an air inlet flange which connects the connection piece to a combustion chamber of the exhaust-gas burner and which seals off the combustion chamber.

The exhaust-gas tract according to aspects of the invention allows a defective check valve to be exchanged easily. Because the check valve is connected to the combustion chamber via the air inlet flange, either the air inlet flange or the connection piece, together with the check valve, arranged on the air inlet flange, or the check valve alone, can be easily released and removed from the exhaust-gas tract. This furthermore allows a much simpler assembly process during the manufacturing process, whereby said assembly process is made much more cost-effective. It is preferably provided that the air inlet flange is arranged on an outer side of the exhaust-gas burner. The air inlet flange is preferably screwed onto the outer side of the exhaust-gas burner. The connection piece is preferably configured for connection to an intake pipe or an air inlet channel of an internal combustion engine or an air inlet channel of a separate air compressor.

Advantageous embodiments and refinements of the invention will emerge from the dependent claims and from the description with reference to the drawings.

According to a preferred embodiment of the invention, it is provided that the air inlet flange is designed as a turned part or deep-drawn part and/or in that the connection piece is designed as a turned part or deep-drawn part. It is particularly preferable if the air inlet flange is designed as a deep-drawn part and the connection piece is designed as a turned part. This allows very inexpensive but also highly precise production of the air inlet connection. Alternatively or additionally, it is preferably provided that the air inlet flange is produced from a plastic.

According to a further preferred embodiment of the invention, it is provided that the check valve has a valve housing and a bell-shaped valve disk, wherein the valve disk is pressed against the valve housing in order to close the check valve. This makes a clean seal possible when the check valve is closed. It is preferably provided that the valve disk is manufactured from a metal. It is preferably provided that the valve housing is produced from a metal or from a plastic.

According to a further preferred embodiment of the invention, it is provided that the valve disk is pressed with a first sealing surface of the valve disk against a second sealing surface of the valve housing in order to close the check valve, wherein neither the first sealing surface nor the second sealing surface has a rubber coating for sealing provided thereon, wherein the first sealing surface and/or the second sealing surface are preferably manufactured from a metal. This advantageously prevents the check valve from sticking, which ensures that the check valve maintains high response dynamics over its entire service life.

According to a further preferred embodiment of the invention, it is provided that the valve disk is pressed with a first sealing surface of the valve disk against a second sealing surface of the valve housing in order to close the check valve, wherein a rubber coating for sealing is arranged on the first sealing surface and/or on the second sealing surface. The use of rubber coatings reduces the demands on the manufacturing accuracy of the sealing surfaces while maintaining the same sealing action, whereby the manufacturing costs can be reduced.

According to a further preferred embodiment of the invention, it is provided that the check valve is preloaded into a closed position preferably by means of a spring, wherein the preload is preferably adjustable by means of a threaded nut. This advantageously makes it possible to adjust the response behavior of the check valve.

According to a further preferred embodiment of the invention, it is provided that the check valve is clipped into the air inlet connection, wherein the check valve is preferably removable from the air inlet connection in nondestructive fashion. This advantageously further simplifies the manufacture and the exchange of the check valve. It is conceivable that the valve housing has means, for example one or more securing rings, for positively locking connection to the air inlet connection, in particular to the connection piece. It is however also conceivable that the check valve is screwed into the air inlet connection, in particular into the connection piece.

According to a further preferred embodiment of the invention, it is provided that the valve housing is designed as a turned part, wherein the second sealing surface is preferably finely turned. In this way, cost-effective but highly precise production of the check valve is possible. It is however also conceivable for the valve housing to be produced from a plastic.

According to a further preferred embodiment of the invention, it is provided that the valve housing is designed as a molded pressed part composed of metal and/or plastic. This can be done by way of sintering, extrusion or thermal molding. In this way, inexpensive and highly precise production of the check valve is likewise possible.

According to a further preferred embodiment of the invention, it is provided that the check valve has a guide rod for the guidance of the valve disk between the open position of the check valve and the closed position of the check valve, wherein the guide rod is preferably mounted on a support on the connection piece, wherein the support is preferably arranged on a support holder of the connection piece, wherein the support holder is particularly preferably conical. In this way, a very durable and highly precisely operating check valve is advantageously provided. The guide rod is preferably manufactured from a metal. The support is preferably produced from a metal or from a plastic.

According to a further preferred embodiment of the invention, it is provided that the valve disk is designed as a pressed part or deep-drawn part, wherein the first sealing surface is preferably ground. In this way, cost-effective but highly precise production of the check valve is possible. As an alternative to the ground first sealing surface, it is conceivable that the first sealing surface is pressed.

A further subject of the invention for achieving the object stated in the introduction is a motor vehicle having an exhaust-gas tract according to aspects of the invention.

All of the details, features and advantages disclosed above in conjunction with the exhaust-gas tract according to aspects of the invention likewise relate to the motor vehicle according to aspects of the invention.

BRIEF DESCRIPTION OF THE DRAWINGS

Further details, features and advantages of the invention will emerge from the drawings and from the following description of preferred embodiments on the basis of the drawings. Here, the drawings illustrate merely exemplary embodiments of the invention, which do not restrict the concept of the invention.

DETAILED DESCRIPTION OF THE INVENTION

Figure 1:
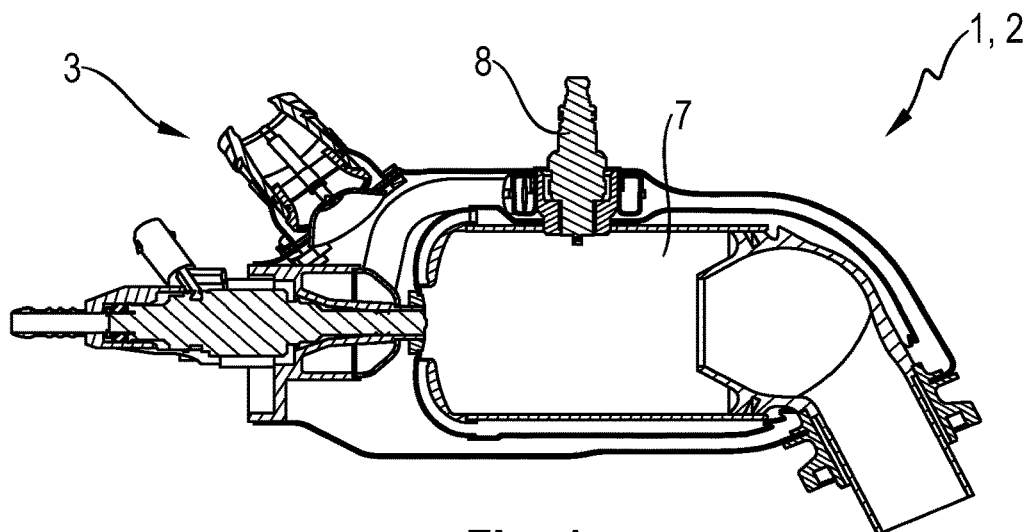
FIG. 1 schematically illustrates a part of an exhaust-gas tract according to an exemplary embodiment of the present invention.

FIG. 1 schematically illustrates a part of an exhaust-gas tract 1 according to an exemplary embodiment of the present invention. An exhaust-gas burner 2 of the exhaust-gas tract 1 can be seen. In a combustion chamber 7 of the exhaust-gas burner 2, a fuel-air mixture is ignited, as required, using an ignition means 8. In this way, the exhaust-gas tract 1 and in particular its components (not shown here for the sake of clarity) for exhaust-gas purification can be heated. The air required for combustion is fed via an air inlet connection 3. The air inlet connection 3 is arranged on the outer side of the exhaust-gas burner 2 and is preferably connected to an air line (not illustrated) of an internal combustion engine. The air inlet connection 3 is illustrated in detail in FIGS. 2 (*a*) and 2 (*b*).

Figures 2A, 2B:
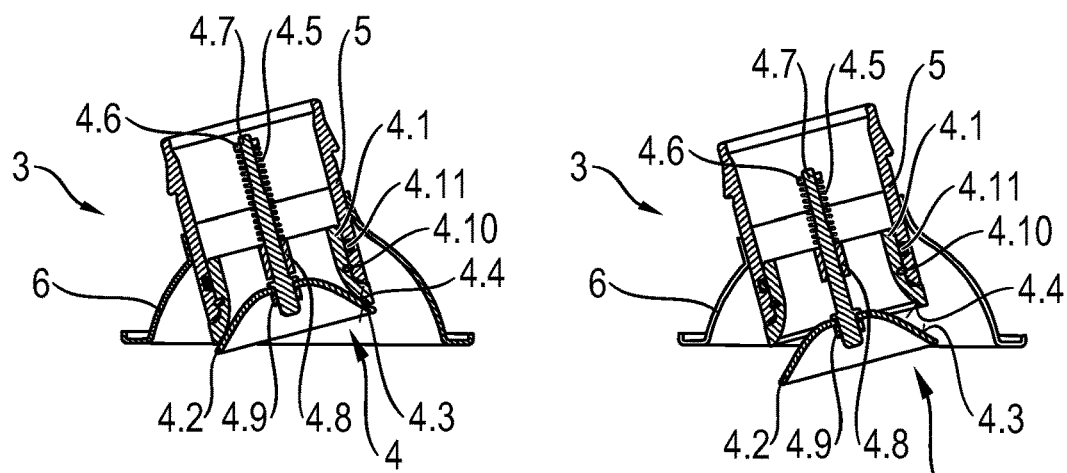
FIGS. 2(*a*) and 2(*b*) each schematically illustrate an air inlet connection of an exhaust-gas tract according to an exemplary embodiment of the present invention.

FIGS. 2 (*a*) and 2 (*b*) each schematically illustrate an air inlet connection 3 of an exhaust-gas tract 1 according to an exemplary embodiment of the present invention. In FIGS. 2 (*a*) and 2 (*b*), the same air inlet connection 3 is illustrated with a closed (FIG. 2 (*a*)) and open check valve 4 (FIG. 2 (*b*)) respectively. The following description therefore relates to both FIG. 2 (*a*) and FIG. 2 (*b*).

For simple assembly on the outer side of the exhaust-gas burner (see FIG. 1), the air inlet connection 3 has an air inlet flange 6 designed as a deep-drawn part or as a turned part. The air inlet flange 6 is preferably screwed onto the outer side of the exhaust-gas burner 2. The check valve 4 is clipped into a connection piece 5 of the air inlet connection 3. The connection piece 5 is designed as a turned part and is inserted and/or pressed or screwed into the air inlet flange 6 and/or welded, adhesively bonded or brazed thereto.

The check valve 4 is pushed with a valve housing 4.1 into the connection piece 5 and is clipped into the connection piece 5 by means of a securing ring 4.11, for example a circlip. This allows simple installation and simple exchange of the check valve 4 without the need for the exhaust-gas burner to be extensively dismantled. For the lateral sealing of the check valve 4, a seal ring 4.10, for example an O-ring, is provided between the valve housing 4.1 and the connection piece 5.

The check valve 4 furthermore has a bell-shaped valve disk 4.2. The valve disk 4.2 is preferably designed as a turned part or pressed part and is guided by means of a guide rod 4.7 between a closed position (FIG. 2 (*a*)) and an open position (FIG. 2 (*b*)). For this purpose, a valve disk stop 4.9 is arranged on the guide rod 4.7 at the lower end, which valve disk stop ensures a firm seat of the valve disk 4.2 on the guide rod 4.7. In the closed position of the check valve 4, the valve disk 4.2 is arranged sealingly with a first sealing surface 4.3 on a second sealing surface 4.4 of the valve housing 4.1. The first sealing surface 4.3 and the second sealing surface 4.4 are preferably finely ground or compression molded and have no rubber coating. Alternatively, however, it is also possible for rubber coatings to be arranged on the first sealing surface 4.3 and/or on the second sealing surface 4.4.

The check valve 4 is preloaded into a closed position by means of a spring 4.5. The preload can be adjusted by means of a threaded nut 4.6, which forms an upper stop of the spring 4.5. The spring 4.5 is, on the side situated opposite the threaded nut 4.6, arranged so as to lie against a support 4.8. The support 4.8 mounted in the valve housing 4.1 also serves for the guidance of the guide rod 4.7 and thus also holds the valve disk 4.2 in a centered manner in relation to the valve housing 4.1.

Figure 3:
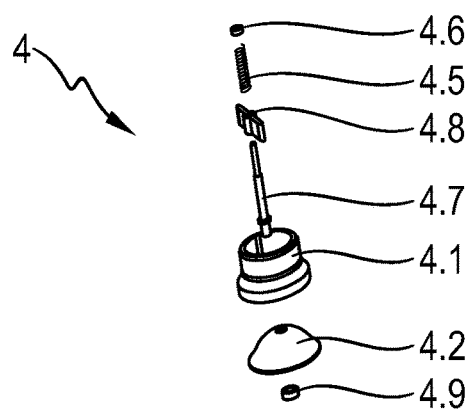
FIG. 3 schematically illustrates, in an exploded view, a check valve of an air inlet connection of an exhaust-gas tract according to an exemplary embodiment of the present invention.

FIG. 3 schematically illustrates, in an exploded view, a check valve 4 of an air inlet connection of an exhaust-gas tract according to an exemplary embodiment of the present invention. The check valve 4 has the valve disk stop 4.9, the valve disk 4.2, the valve housing 4.1, the guide rod 4.7, the support 4.8, the spring 4.5 and the threaded nut 4.6.

Figure 4:
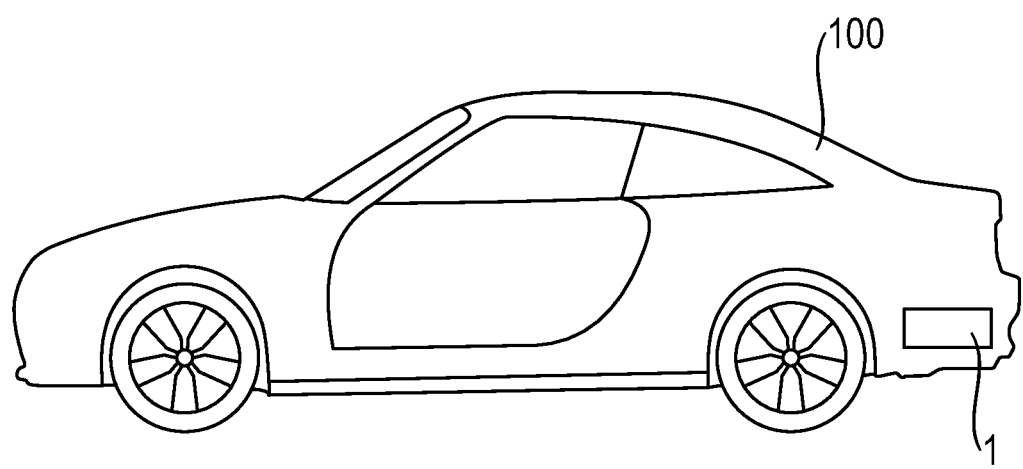
FIG. 4 schematically illustrates a motor vehicle according to an exemplary embodiment of the present invention.

FIG. 4 schematically illustrates a motor vehicle 100 according to an exemplary embodiment of the present invention. The motor vehicle 100 has an exhaust-gas tract 1 according to an exemplary embodiment of the present invention.

LIST OF REFERENCE DESIGNATIONS

1 Exhaust-gas tract
2 Exhaust-gas burner
3 Air inlet connection
4 Check valve
4.1 Valve housing
4.2 Valve disk
4.3 First sealing surface
4.4 Second sealing surface
4.5 Spring
4.6 Threaded nut
4.7 Guide rod
4.8 Support
4.9 Valve disk stop
4.10 Seal ring
4.11 Securing ring
5 Connection piece
5.1 Support holder
6 Air inlet flange
7 Combustion chamber
8 Ignition means
100 Motor vehicle

What is claimed is:

1. An exhaust-gas tract for a motor vehicle, wherein the exhaust-gas tract comprises:
an exhaust-gas burner having an air inlet connection through which air is introduced into the exhaust-gas burner, wherein the air inlet connection has (i) a connection piece, (ii) a check valve arranged in the connection piece that is configured for closing the connection piece, and (iii) an air inlet flange that connects the connection piece to a combustion chamber of the exhaust-gas burner and seals off the combustion chamber,
wherein the check valve includes (i) a valve housing, (ii) a valve disk that is configured to be pressed against the valve housing, and (iii) a guide rod for guiding the valve disk between an open position of the check valve and a closed position of the check valve, wherein the guide rod is mounted on a support on the connection piece, wherein the support is arranged on a support holder of the connection piece.

2. The exhaust-gas tract as claimed in claim 1, wherein the air inlet flange is a turned part or deep-drawn part and/or the connection piece is a turned part or deep-drawn part.

3. The exhaust-gas tract as claimed in claim 1, wherein the valve disk is bell-shaped, and wherein the valve disk is pressed against the valve housing in order to close the check valve.

4. The exhaust-gas tract as claimed in claim 3, wherein the valve disk has a first sealing surface that is configured to seal against a second sealing surface of the valve housing in order to close the check valve.

5. The exhaust-gas tract as claimed in claim 4, wherein a rubber coating for sealing is arranged on the first sealing surface and/or on the second sealing surface.

6. The exhaust-gas tract as claimed in claim 4, wherein the valve housing is a turned part, and wherein the second sealing surface is finely turned.

7. The exhaust-gas tract as claimed in claim 4, wherein neither the first sealing surface nor the second sealing surface has a rubber coating for sealing provided thereon, wherein the first sealing surface and/or the second sealing surface are manufactured from metal.

8. The exhaust-gas tract as claimed in claim 3, wherein the check valve is preloaded into a closed position by a spring, wherein the preload is adjustable by a threaded nut.

9. The exhaust-gas tract as claimed in claim 3, wherein the valve disk is a pressed part or deep-drawn part and the first sealing surface is ground.

10. The exhaust-gas tract as claimed in claim 1, wherein the check valve is clipped into the air inlet connection, and wherein the check valve is configured to be removed from the air inlet connection in a nondestructive fashion.

11. A motor vehicle having the exhaust-gas tract as claimed in claim 1.

12. An exhaust-gas tract for a motor vehicle, wherein the exhaust-gas tract comprises:
an exhaust-gas burner having an air inlet connection through which air is introduced into the exhaust-gas burner, wherein the air inlet connection has (i) a connection piece, (ii) a check valve arranged in the connection piece that is configured for closing the connection piece, and (iii) an air inlet flange that connects the connection piece to a combustion chamber of the exhaust-gas burner and seals off the combustion chamber,
wherein the check valve includes a valve housing and a bell-shaped valve disk, wherein the valve disk is pressed against the valve housing,
wherein the check valve is preloaded into a closed position by a spring, wherein the preload is adjustable by a threaded nut,
wherein the check valve has a guide rod for guiding the valve disk between an open position of the check valve and a closed position of the check valve, wherein the guide rod is mounted on a support on the connection piece, wherein the support is arranged on a conically shaped support holder of the connection piece.

* * * * *